United States Patent
Yasuna et al.

(10) Patent No.: US 7,116,509 B2
(45) Date of Patent: Oct. 3, 2006

(54) MAGNETIC DISK APPARATUS AND SERVO SIGNAL RECORDING METHOD

(75) Inventors: Kei Yasuna, Chiyoda (JP); Yohichi Kusagaya, Mishima (JP); Takashi Yamaguchi, Tsuchiura (JP); Makoto Horisaki, Odawara (JP); Kenichiro Sugiyama, Abiko (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 375 days.

(21) Appl. No.: 10/639,657

(22) Filed: Aug. 13, 2003

(65) Prior Publication Data
US 2004/0190184 A1    Sep. 30, 2004

(30) Foreign Application Priority Data
Mar. 25, 2003    (JP)    ............................. 2003-083018

(51) Int. Cl.
*G11B 21/02*    (2006.01)

(52) U.S. Cl. ....................................................... 360/75

(58) Field of Classification Search ................. 360/75, 360/51, 31; 711/4
See application file for complete search history.

(56) References Cited
U.S. PATENT DOCUMENTS

| | | | | |
|---|---|---|---|---|
| 3,883,853 A | * | 5/1975 | O'Brien et al. ................. | 711/4 |
| 5,485,322 A | * | 1/1996 | Chainer et al. ................ | 360/51 |
| 5,519,546 A | | 5/1996 | Lewis | |
| 5,581,420 A | * | 12/1996 | Chainer et al. ................ | 360/75 |
| 5,615,058 A | * | 3/1997 | Chainer et al. ................ | 360/51 |
| 5,748,398 A | | 5/1998 | Seo | |
| 5,949,603 A | * | 9/1999 | Brown et al. .................. | 360/75 |
| 6,040,955 A | * | 3/2000 | Brown et al. .................. | 360/75 |
| 6,215,606 B1 | * | 4/2001 | Chainer et al. ................ | 360/31 |

FOREIGN PATENT DOCUMENTS

| | | |
|---|---|---|
| CN | 1111025 | 11/1995 |
| JP | 1111025 A | 11/1995 |
| JP | A-2000-123509 | 4/2000 |
| KR | 2000-0034858 | 6/2000 |

* cited by examiner

*Primary Examiner*—David Hudspeth
*Assistant Examiner*—Fred F. Tzeng
(74) *Attorney, Agent, or Firm*—Antonelli, Terry, Stout and Kraus, LLP.

(57) ABSTRACT

A magnetic disk apparatus capable of generating a reference clock signal without using an external reference by writing a clock track only once using a head of the magnetic disk apparatus even if the head is of a read/write element separation type. Using the head of the magnetic disk apparatus, a clock track is recorded only once and the recorded clock track is played back to measure the total number of clock bits in one revolution. A time interval between servo sectors is determined by dividing the total number of clock bits thus measured by the number of servo sectors. By using as a timing reference the clock bits produced by playing back the clock track, the servo sectors are recorded in such a manner that they are located at the determined interval.

13 Claims, 8 Drawing Sheets

MAGNETIC DISK APPARATUS AND SERVO SIGNAL RECORDING METHOD

BACKGROUND OF THE INVENTION

The present invention relates to a magnetic disk apparatus and a servo signal recording method and more specifically to a servo write operation that records a reference clock signal used as a timing reference for writing a servo signal without using a dedicated clock head in a magnetic disk apparatus such as a hard disk drive.

In magnetic disk apparatus, several tens to more than several hundreds of servo signals (servo sectors) are placed on a recording surface of the disk in each cyclic movement (revolution) for position detection of the head.

In a normal servo write process, as described in JP-A-2000-123509, a dedicated head called a clock head is used to record a clock track on the recording surface to define a circumferential position of each servo sector. Reading this clock track produces a clock signal representing a position of the servo sector in a disk rotating direction (refer to reference 1).

Another proposed method, as described in U.S. Pat. No. 5,519,546, involves producing a clock signal by using a normal head of a magnetic disk apparatus without using a dedicated head.

The method described in the U.S. Pat. No. 5,519,546 requires a head of the magnetic disk apparatus to read a part of the clock track already recorded on the disk surface and at the same time write a new track to connect them in a circumferential direction. With magnetoresistive heads currently in use on general magnetic disk apparatus, since a writing element and a reading element are separated from each other, a problem arises that a newly recorded track does not connect to the already recorded track.

Further, conventional clock tracks, such as those described in JP-A-2000-123509, are generally managed strictly in such a manner that the number of clock bits in each revolution can be divided by the number of sectors. This makes it necessary to perform the writing operation again if a bit length of a write connecting portion in one revolution fails to fall within a certain range.

However, in cases where a head of a magnetic disk apparatus available in recent years, whose writing or reading element is only several hundred nm wide, is used to record tracks, there is a fear that the writing element may not be able to be positioned correctly on the clock track, failing to perform the rewriting operation described above.

BRIEF SUMMARY OF THE INVENTION

The present invention has been accomplished to solve the above-mentioned problems experienced with the conventional techniques and provides a magnetic disk apparatus and a servo signal recording method which allow even a head of a read/write element separation type to generate a reference clock signal by performing a clock track recording once.

These and other objects and novel features of the present invention will become apparent from the following description of this specification and the accompanying drawings.

Representative aspects of this invention may be summarized as follows.

That is, to solve the problems described above, the magnetic disk apparatus of this invention employs a method of writing a clock track only once for one or more revolutions.

Then, the written clock track is read to measure a total number of clock bits in one revolution, which is then divided by the number of servo sectors to determine a servo sector interval.

Next, the servo sectors are written at the determined interval while counting the clock bits that are obtained by reading back the clock track.

Other objects, features and advantages of the invention will become apparent from the following description of the embodiments of the invention taken in conjunction with the accompanying drawings.

DETAILED DESCRIPTION OF THE INVENTION

Now, one embodiment of the present invention will be described in detail by referring to the accompanying drawings.

Throughout the drawings of this embodiment, like reference numbers are assigned to those parts with identical functions and their repetitive explanations are omitted.

The present invention relates to a method of generating a reference clock used as a reference for timing when writing a servo pattern.

Figure 1:
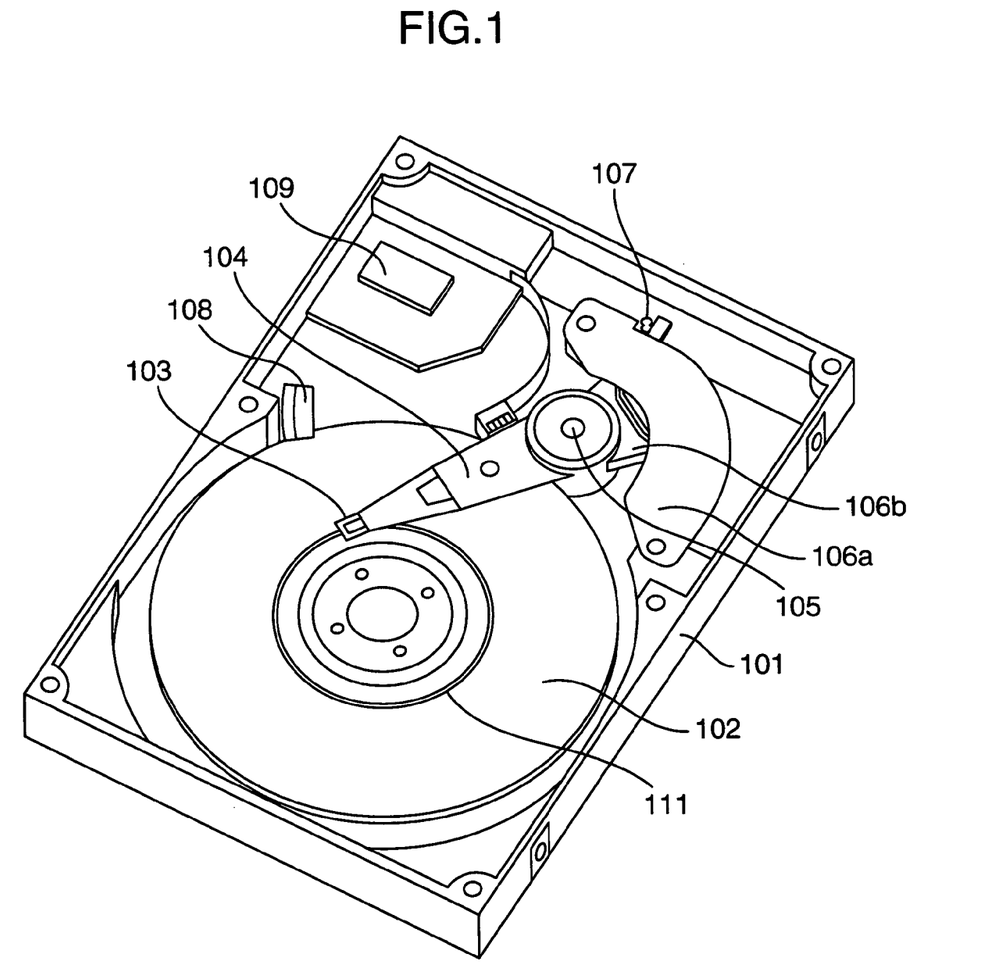
FIG. 1 is a perspective view showing a magnetic disk apparatus of one embodiment of this invention, with a housing cover open.

FIG. 1 is a perspective view showing an outline construction of a magnetic disk apparatus of one embodiment of this invention.

While the top of a housing 101 is normally attached with a housing cover to enclose inner constitutional elements, FIG. 1 illustrates a state in which the housing cover is removed for the constitutional elements to be seen from outside.

The magnetic disk apparatus of this embodiment includes a disk-shaped medium 102 for recording information on a disk surface thereof, and a head 103 having a writing element (not shown) for writing information on the medium 102 and a reading element (not shown) for reading information from the medium 102.

The head 103 is pivotally supported on a pivot 105 through a head arm 104 and is moved to a desired radial position on the medium 102 by an actuator having a moving coil and a stationary magnet 106a.

The head 103 is driven by a read/write driver IC 109 to perform a writing or reading operation. When not performing the read/write operation, the head 103 is retracted onto a ramp mechanism 108 situated outside the medium 102 so that it is held completely off the recording surface of the medium 102.

This control sequence is performed by a control circuit not shown which is connected to the magnetic disk apparatus.

The control circuit has a controller for system control, a signal processing circuit, an actuator driver, and a power supply circuit.

A feature of the magnetic disk apparatus of this embodiment lies in the fact that a clock track 111 is recorded by using the head 103 of the apparatus at an initial stage of the servo write operation and that, based on a readback signal (reference clock) of the clock track 111, a write timing of a servo pattern is adjusted.

Figure 2:
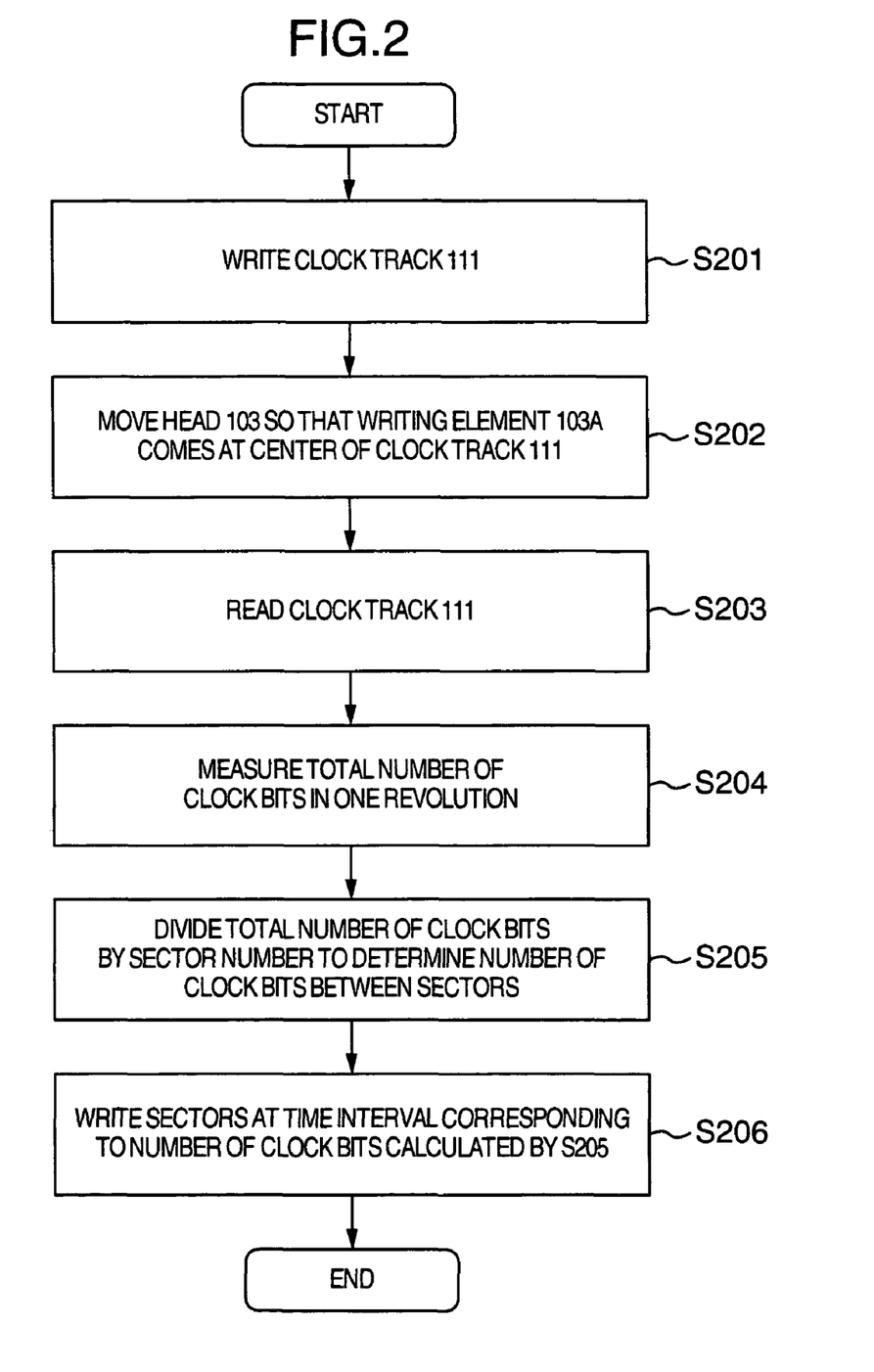
FIG. 2 is a diagram showing a sequence of steps from a clock track generation to an initial track recording in an initial stage of a servo write operation of the magnetic disc apparatus as one embodiment of the invention.

FIG. 2 shows a sequence of steps from the generation of clocks to the initial track recording in the initial stage of the servo write operation in the magnetic disk apparatus of this embodiment.

In the magnetic disk apparatus of this embodiment, at the first stage of servo write, the head 103 is loaded onto the disk surface of the medium 102 and then the actuator movable portion 106b is pressed against a movable range limit stopper 107 to hold the head 103 at a position on the disk innermost circumference side of the movable range.

The recording of the clock track 111 is performed by using the writing element when the head 103 is at the disk innermost position (step S201).

A recording frequency of the clock track needs to be able to ensure a signal quality in terms of magnetic recording. In practice, it is also preferred from the standpoint of a circuit characteristic that the recording frequency be set almost equal to a servo signal frequency. In the case of a 2.5-inch magnetic disk apparatus currently in production, for example, the clock track recording frequency is set in a range of between 20 MHz and 40 MHz.

It is also possible to use a base clock signal in the control circuit as a reference if the frequency is within an appropriate range. In this embodiment, the clock track recording frequency is set equal to a frequency of a servo track to be recorded.

With the recording of the clock track 111 completed, a driving force of the actuator 106 is changed to move the reading element near a center of the clock track 111 (step S202).

A geometrical relation between the writing element and the reading element of the head 103 is so set that the writing element is situated slightly on the outer circumferential side with respect to the reading element.

Therefore, at step S202, the writing element is situated slightly outside the clock track 111.

The number of clock bits recorded by step S201 is influenced by disk revolution speed variations characteristic of individual magnetic disk apparatus and varies from one write operation to another.

At the position to which the head was moved by step S202, the clock track 111 is read (step S203) and, based on a readback signal, the number of clock bits in one disk revolution is measured (step S204).

The number of clock bits in one disk revolution is determined, for example, by adding up measured time intervals at which the head 103 passes markers 111a.

Then, the number of clock bits in one revolution is divided by the number of sectors to determine intervals in clock bits between adjacent sectors (servo sectors) (step S205).

The number of clock bits in one revolution cannot necessarily be divided by the number of sectors to be recorded. Errors caused by rounding a quotient of the division result in sector interval variations. Thus, the quotient of the division is calculated not only to an integral part but also to a fractional part.

With the sector interval determined, an electric current is applied to the writing element 103b at the interval calculated by step S205 to record sectors in the first track while reading the clock track 111 and counting the clock bits in the clock track 111 (step S206).

After the first track has been recorded and the sectors' circumferential positions are determined, successive tracks are written according to this pattern progressively outwardly toward the outer circumference until the entire disk surface is written with the servo signal.

The process of generating a clock signal used as a timing reference for writing a servo signal in the magnetic disk apparatus of this embodiment has been shown. Each of the steps in this process will be described in more detail.

The writing of the clock track 111 in step S201 will be explained with reference to FIGS. 3A to 3C.

Figure 3A:
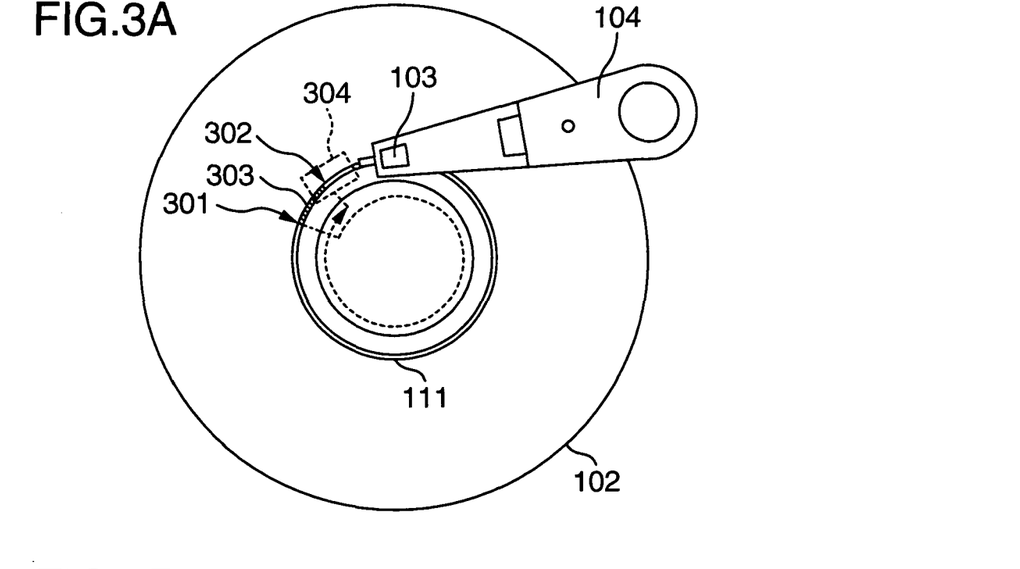
FIGS. 3A, 3B and 3C are schematic diagrams showing a clock track pattern to be recorded by the magnetic disk apparatus.
Figure 3B:
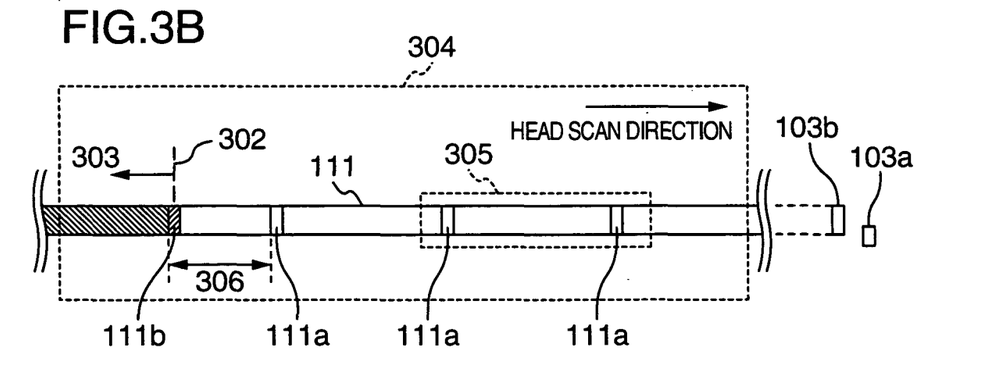
Figure 3C:
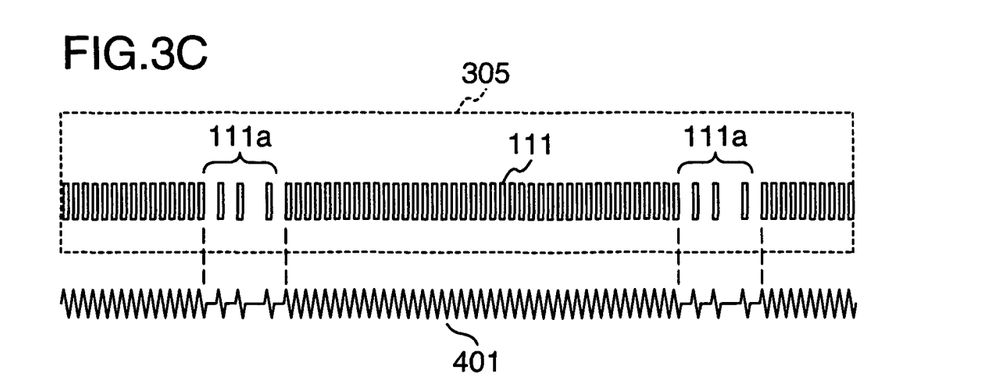

FIGS. 3A to 3C illustrate a pattern of the clock track 111 recorded in the magnetic disk apparatus of this embodiment.

FIG. 3A schematically shows the head 103, the medium 102 and the track immediately after the clock track 111 has been recorded.

The writing of the clock track 111 begins with a position 301 on the disk surface of the medium 102 and ends with a position 302 after one revolution. A range in which this write operation is performed is shown by a dashed line arrow at an inner circumferential part of the medium.

Hence, what remains in a region 303 between the position 301 and the position 302 is a pattern written over in the second revolution.

FIG. 3B shows a magnified view of the clock track 111 in the region 304 of FIG. 3A. In FIG. 3B, reference number 103a represents a reading element and 103b a writing element.

The clock track 111 is embedded with markers 111a at predetermined intervals. The remaining portion is recorded with a pattern A11-1 of a single frequency.

The markers 111a are recorded at predetermined intervals for more than one revolution and at the end of the recording operation an index marker 111b distinguishable from other markers is recorded to finish the recording of the clock track 111.

Since the time of one disk revolution cannot, strictly speaking, be divided without a remainder by the time interval of the markers 111a, a segment 306 between the last recorded index marker 111b and the next marker 111a differs from the interval between the markers 111a themselves.

The number of clock bits in this segment 306 reflects the revolution speed of the disk in the magnetic disk apparatus in which the pattern is to be written.

For example, if the disk revolution speed in a magnetic disk apparatus is slightly faster than a design value due to variations in a reference oscillator frequency of each revolution speed control circuit, the number of clock bits in the segment 306 increases; and if the disk revolution speed is slightly slower than the design value, the number of clock bits in the segment 306 decreases. The number of clock bits in this segment 306 is measured after the writing operation. The measuring operation will be described later.

FIG. 3C shows a magnified view of the clock track 111 for a segment 305 containing markers 111a in FIG. 3B. A readback signal waveform 401 produced by reading the pattern is shown below the pattern such that the waveform corresponds to the pattern in an elapsed time.

The pattern of the marker 111a produces such a readback signal waveform as can be distinguished from other parts, and monitoring the readback signal can detect when the reading element passes the marker.

The operation of measuring the number of clock bits by reading the clock track 111 shown in FIGS. 3A–3C will be explained by referring to FIG. 4 and FIG. 5.

Figure 4:
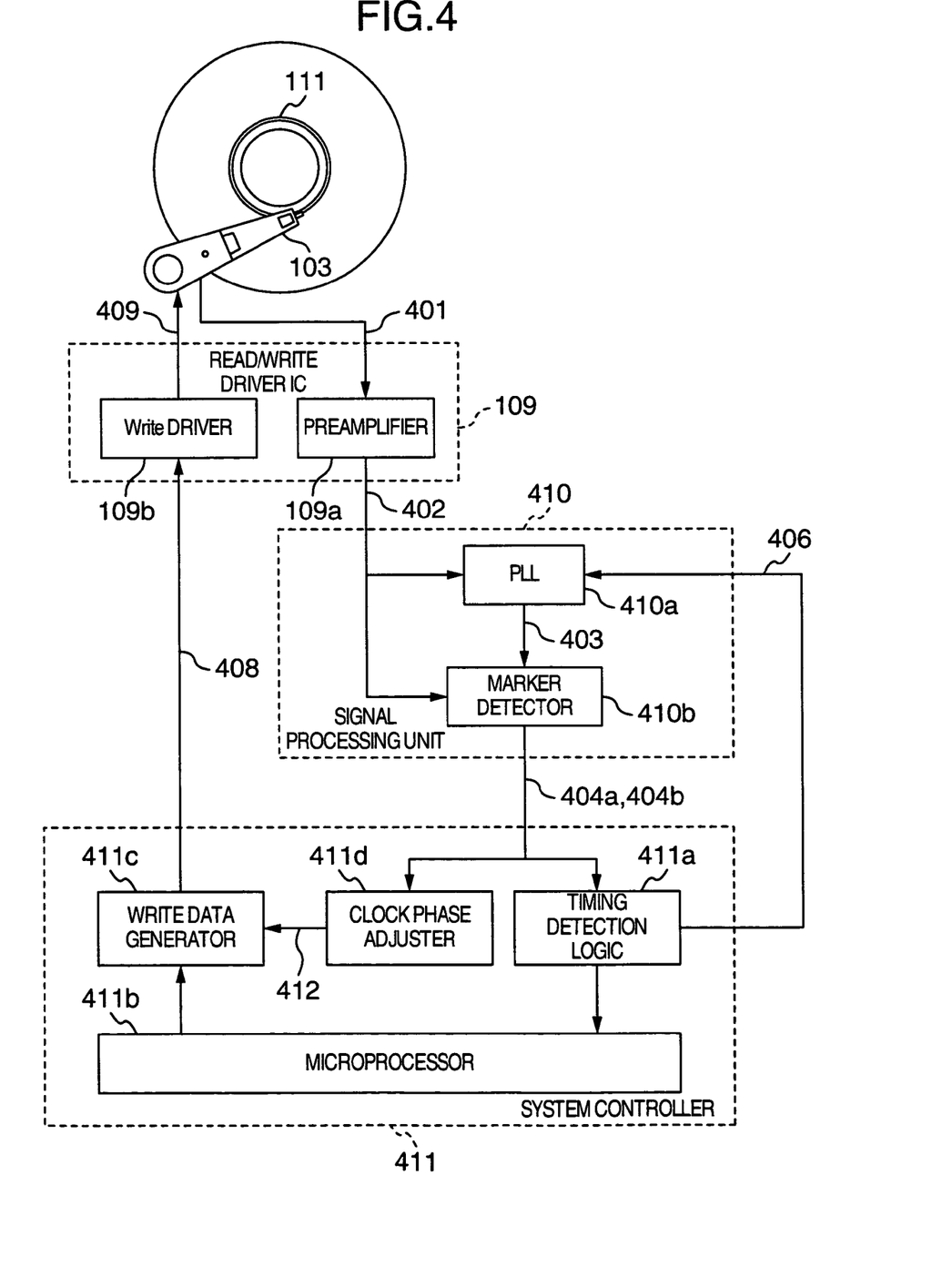
FIG. 4 is a schematic diagram showing a signal path associated with a read/write operation of the magnetic disk apparatus.

FIG. 4 shows signal paths associated with the read/write operation of the magnetic disk apparatus of this embodiment, schematically showing how signals are processed during the writing and reading operations.

Figure 5:
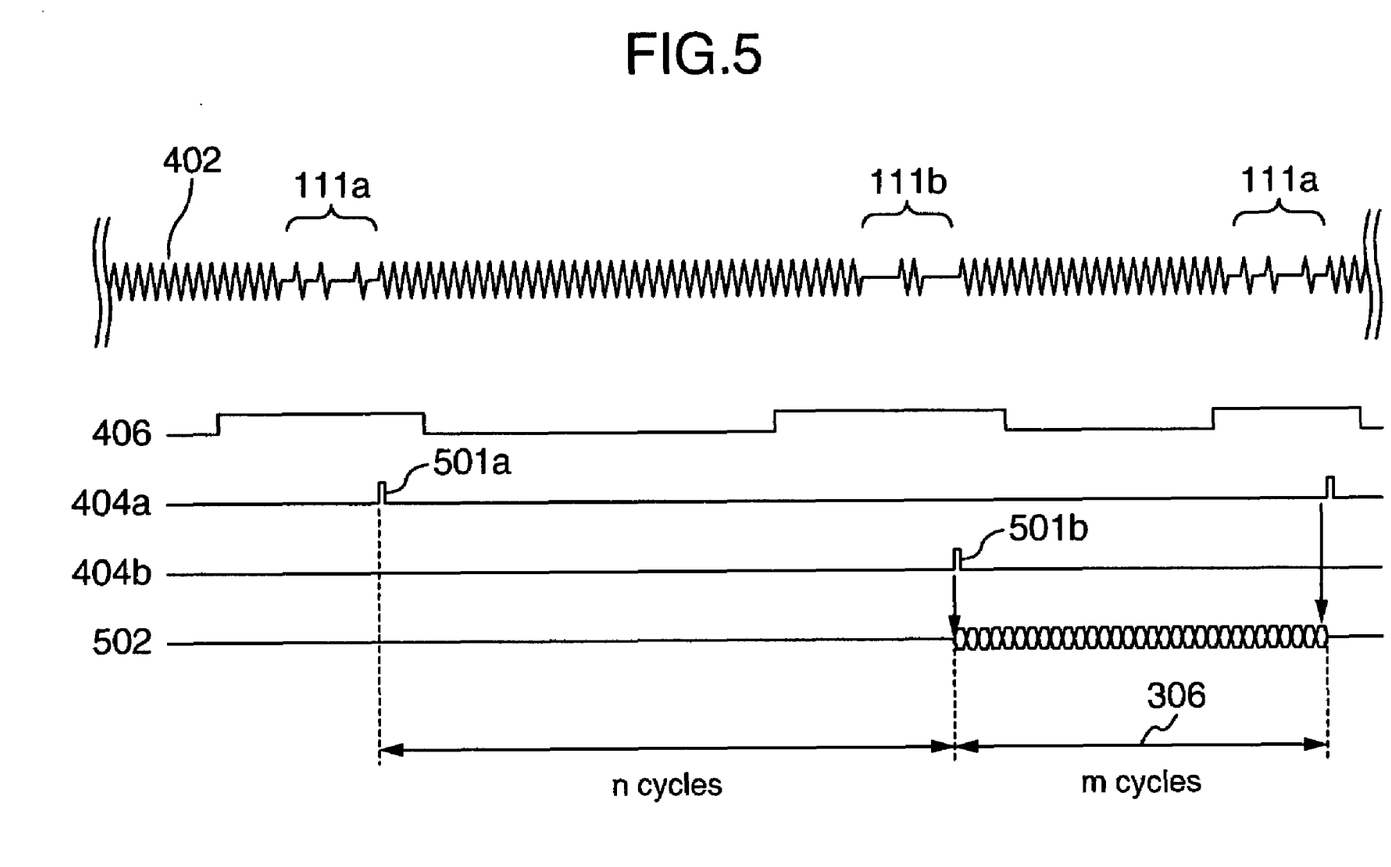
FIG. 5 is a diagram showing an operation to measure the number of clock bits in a clock track to be recorded by the magnetic disk apparatus.

FIG. 5 illustrates the operation of measuring the number of clock bits in the clock track 111 recorded in the magnetic disk apparatus of this embodiment, showing how associated signals change in response to a readback signal.

A readback signal 401 read from the medium 102 by the reading element 103a of the head 103 is amplified by a preamplifier 109a in the read/write driver IC 109. The amplified readback signal 402 is sent to a signal processing unit 410.

From the readback signal 401, the signal processing unit 410 detects the passage of the marker 111a and the index marker 111b.

The marker detection is done by a marker detector 410b in the signal processing unit acquiring the presence or absence of di-bits of the readback signal every clock and at the same time checking a bit pattern.

As the clock used by the marker detector 410b to pick up bits, a PLL output clock 403 is used which is produced by a PLL unit 410a in phase with the amplified readback signal 402.

Near the marker 111a, a hold signal 406 from a system controller 411 to the PLL unit 410a is made active to temporarily hold a PLL clock 403.

During this process, strictly speaking, when the disk revolution speed varies, a phase shift occurs between the waveform of the readback signal 402 and the PLL clock 403. However, since the time during which to hold the PLL unit 410a is very short, about a few hundred ns, the effect of the speed change of a mechanism system, such as disk revolution, is negligible.

As a result, even near the marker 111a, the operation of the marker detector 410b can be synchronized with the waveform of the readback signal 402 regardless of the presence or absence of di-bits.

The marker detector 410b, upon detecting a bit pattern of the marker 111a, produces a pulse 501a as a marker detection signal 404a.

When the index marker 111b is detected, the marker detector 410b outputs a pulse 501b as an index marker detection signal 404b.

Since the operation of the marker detector 410b is in synchronism with the readback signal at all times, as described above, these pulses (501a, 501b) are output a predetermined number of clocks, 2 or 3 clocks, after the reading element 103a of the head has passed the marker 111a or index marker 111b.

After the marker 111a is detected, the hold signal to the PLL unit 410a is deactivated, allowing the PLL unit 410a to be in phase again with the signal A11-1 to generate a PLL clock 403 following the variations of the disk rotation speed.

Since, during the recording of the clock track 111, the interval of the markers 111a is constant, the amount of change in clock bits caused by the disk revolution speed variations appears as the number of clock bits contained in the segment 306 between the index marker 111b and the next marker 111a.

The number of clock bits in the segment 306 is determined by measuring the number of clock cycles from the index marker detection pulse 501b to the next marker detection pulse 501a by a counter in a timing detection logic 411a of the system controller 411 (502 in FIG. 5).

The total number of clock bits in one revolution is calculated from the number of clock cycles in the segment 306, the number of clock bits between the markers during recording and the number of markers present in one clock track revolution.

For example, if the number of clock cycles in the segment 306 is m cycles, the number of clock bits between the markers during recording is n cycles, and there are k markers including indices in one track revolution, the total number of clock bits Nclk is as follows.

$$Nclk = (k-1)*n + m \tag{1}$$

Now, the operation of steps S205 and S206, which, based on the total number of clock bits measured, calculates a sector start position and records a first servo track, will be explained by referring to FIGS. 6A and 6B.

Figure 6A:
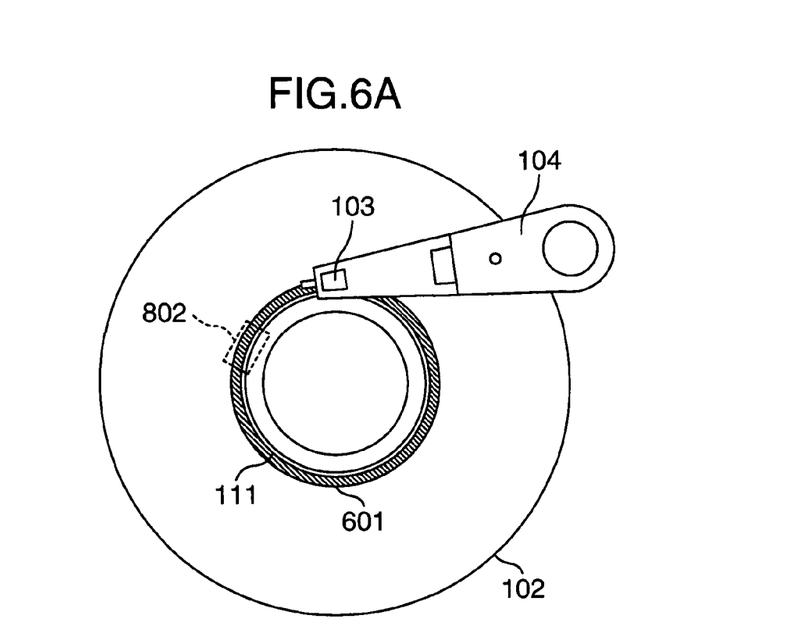
FIGS. 6A and 6B are schematic diagrams showing an operation to record a first servo track based on a readback signal of the clock track in the magnetic disk apparatus.
Figure 6B:
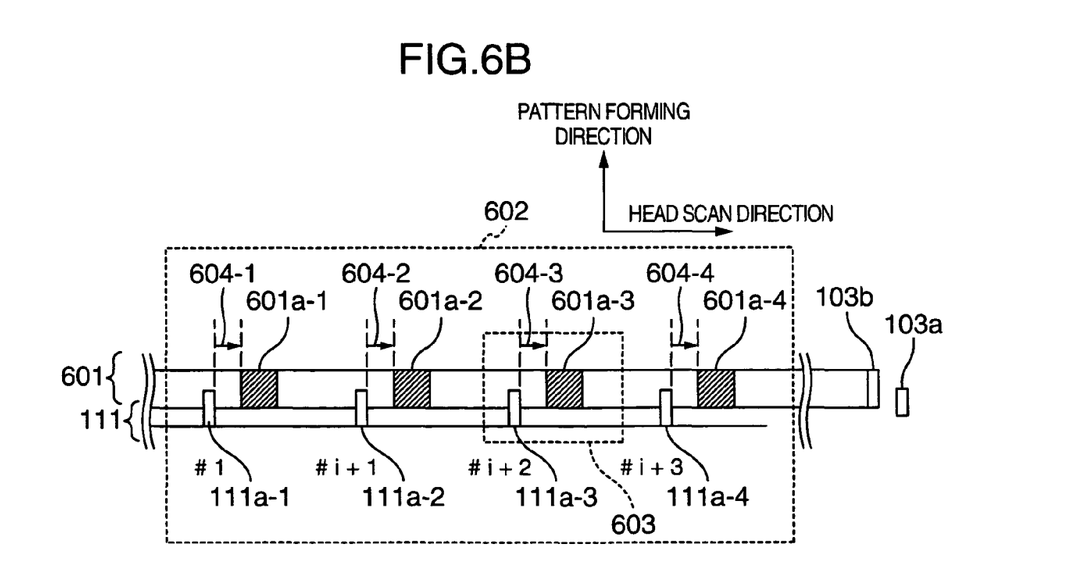

FIGS. 6A and 6B illustrate the operation of recording the first servo track based on the readback signal of the clock track in the magnetic disk apparatus of this embodiment.

FIG. 6A schematically shows the head 103, the medium 102 and the track immediately after the first servo track 601 has been recorded while reading the clock track 111. FIG. 6B shows a magnified view of a region 602 in FIG. 6A.

The servo track 601 actually is not a contiguous pattern but made up of a series of intermittently recorded sectors 601a-1, 601a-2, 601a-3, 601a-4.

The sector start position in the first servo track is preferably situated at one of positions that divide one circumference into equidistant segments. Thus, as shown at 604-1, 604-2, 604-3, 604-4 in FIG. 6B, a delay time is individually set for each sector.

For instance, if the number of markers k is equal to the number of sectors, a Write delay Dw in writing an i-th sector is given by $$Dw(i) = \{(Nclk/k) - n\}*i + d \tag{2}$$

Where d is a fixed offset for all sectors and is selected so that the delays for all sectors are positive and that the writing start position of each sector is as close to the marker as possible.

Figure 7A:
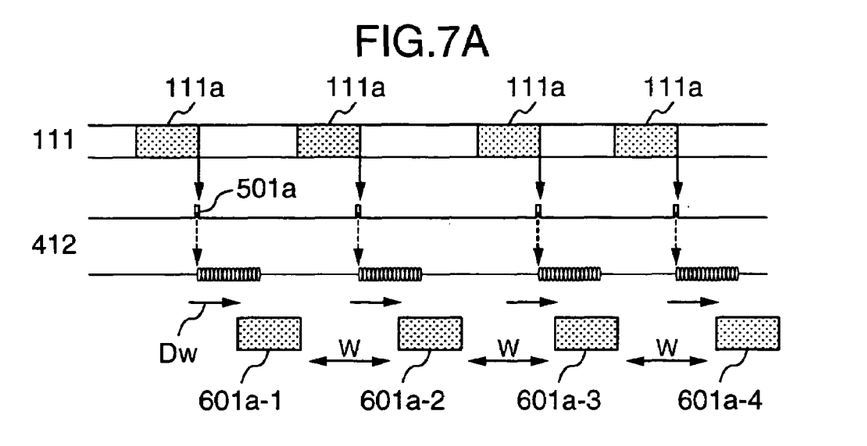
FIGS. 7A, 7B and 7C are diagrams showing a configuration to adjust a delay that occurs when writing each sector in the magnetic disk apparatus.

Next, referring to FIGS. 7A, 7B and 7C, the Write delay Dw during the sector recording will be explained. This embodiment uses intermittent clocks generated by taking the markers 111a as reference and adjusts the Write delay Dw for each sector 601a so as to write the sectors 601a at equal intervals. As shown in FIG. 7A, from a time 501a at which the marker 111a is detected during the readback of the recorded track 111, an intermittent Write clock 412 is initiated. Further, the Write delay Dw for each sector 601a is adjusted to an optimum value in recording the pattern so that the intervals W between the sectors 601 are equal.

Figure 7B:
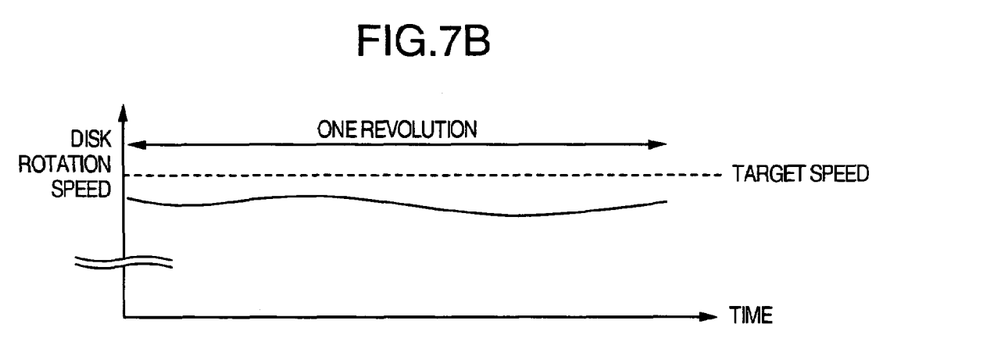
Figure 7C:
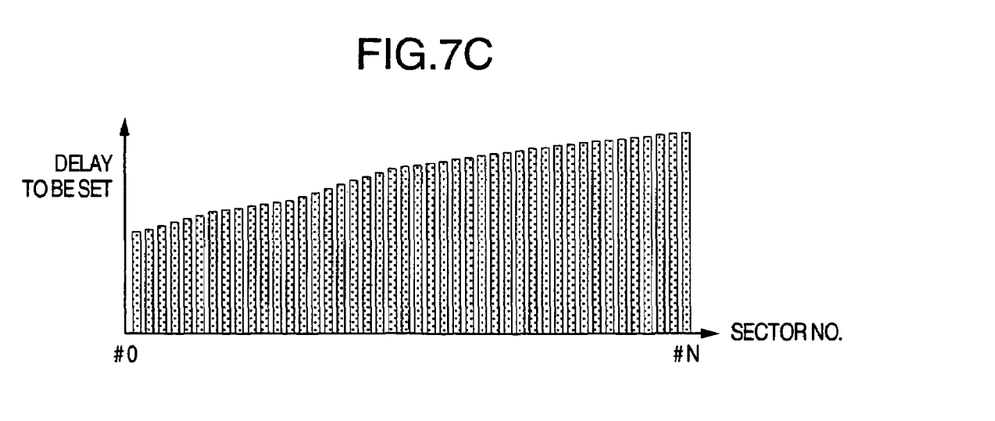

If an actual disk revolution speed during the writing of the clock track is slower than a target speed indicated by a dashed line, as shown in FIG. 7B, the marker writing position falls short of the sector's circumferential target position by an increasing distance as the marker distance from the write start position increases. To set the sectors at equal intervals, therefore, the Write delay Dw is adjusted to increase as the sector distance from the write start position increases, as shown in FIG. 7C.

As the timing reference used in step S206 when recording sectors by using the Write delay obtained by the method described above, a clock signal that can follow disk revolution speed variations is used. This clock signal is generated in the signal processing unit 410 by playing back the clock track 111 with the reading element 103a, as in the clock bit number measuring operation in step S203.

In this case also, as in step S203, the PLL hold signal 406 is made active near the marker to hold the PLL clock 403.

In addition, in regions where a readback signal cannot be acquired, sectors 601a are recorded by holding the PLL clock to ensure that the marker detection operation can be performed by the marker detector 410b without a trouble.

The timing management in the system controller 411 can follow disk revolution speed variations at all times if the PLL clock 403 generated by the signal processing unit 410 is used. However, if the clock signal can be put in phase with the marker detection pulses (501a, 501b) that are in synchronism with the disk revolution, no problem occurs with the recording of sectors 601a and therefore a base clock signal in the circuit may be used.

The operation of adjusting the writing start timing will be explained by referring to FIG. 4 and FIG. 8.

Figure 8:
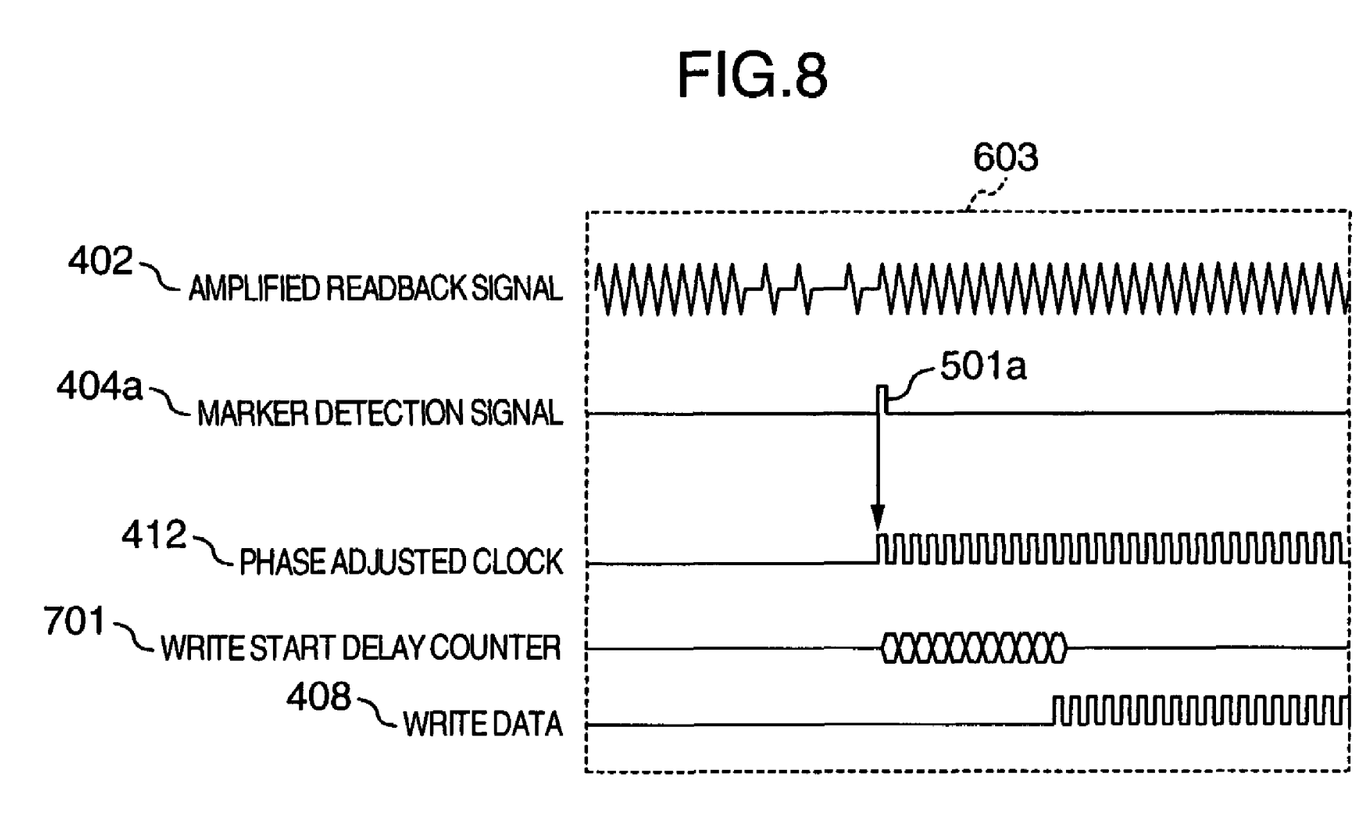
FIG. 8 is a diagram showing a timing adjust operation from a marker detection to a write start in the magnetic disk apparatus.

FIG. 8 shows a timing adjust operation from the marker detection to the start of recording in the magnetic disk apparatus of this embodiment. Signals shown in the figure are those transferred to and from the system controller 411 before a write current is applied, in the process of writing a sector 601a-3 in a region marked by a dashed line 603 of FIG. 6B after the reading element has passed the marker 111a-3.

When a marker detection pulse 501a is sent from the marker detector 410b to the system controller 411 when the reading element passes the marker 111a-3, a clock phase adjuster 411d generates a phase adjust clock signal 412 optimum for the writing adjustment based on the time at which the marker detection pulse 501a was detected, and is used as a clock for sending Write data 408.

As to an integral part of a value representing the sector interval in clock bits, a timing adjustment in phase with the readback waveform is done by a write data sending unit 411c waiting until its write start delay counter 701 reaches a predetermined count value and then outputting Write data 408.

A Write driver 109b, based on the Write data 408, supplies a write signal 409 to the writing element 103b of the head 103 to write a servo signal in the medium 102.

As to a fractional part of the value representing the sector interval in clock bits, a timing adjustment is done by deliberately shifting a phase relation between the marker detection pulse 501a and the phase adjust clock 412 by the clock phase adjuster 411d.

This function enables an adjustment of the write start timing for the fractional part of the sector interval value even if the total number of clock bits in one revolution cannot be divided by the number of sectors in step S205.

The method of recording sectors 601a in a servo track at equal intervals in a circumferential direction by using the writing element 103b of the head 103 of the magnetic disk apparatus without using a dedicated clock head has been described. Subsequent servo tracks will then be written according to the recorded track until the entire disk surface is recorded with servo signals.

It will be understood that the foregoing description has been made on one embodiment of the invention and that the invention is not limited to the configuration of this embodiment and various changes and modifications may be made without departing from the spirit of the invention.

An effect produced by a representative aspect of this invention may be briefly summarized as follows.

The embodiment of this invention makes it possible to generate a reference clock signal and record servo sectors at equal intervals by using only the head of the magnetic disk apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A magnetic disk apparatus comprising:
  a magnetic disk for storing information;
  a head having a writing element for writing information on the magnetic disk and a reading element for reading information from the magnetic disk; and
  an actuator for moving the head to a desired radial position;
  wherein said magnetic disk further comprises:
    a clock track, written by said head, for recording a reference clock, and
    a servo signal written by said head for detecting a position of said head; and
  wherein a number of clock bits between servo signals to be recorded is obtained by dividing the number of clock bits of said clock track by the number of servo sectors to be recorded.

2. A magnetic disk apparatus according to claim 1, wherein a plurality of markers are recorded in the clock track at a predetermined interval so that their circumferential positions in the clock track are identifiable.

3. A magnetic disk apparatus according to claim 2, wherein a result of measuring a time interval it takes for each of the makers to pass the head is added up to determine the number of clock bits in one revolution of the disk.

4. A magnetic disk apparatus according to claim 2, wherein the marker-servo sector delay progressively increases in a scan direction of the head from a shortest marker-servo sector delay.

5. A magnetic disk apparatus according to claim 1, wherein the clock track is provided at an innermost circumferential position of the magnetic disk.

6. In a magnetic disk apparatus including a magnetic disk for storing information, a head having a writing element for writing information on the magnetic disk and a reading element for reading information from the magnetic disk, and an actuator for moving the head to a desired radial position; a servo signal recording method for recording in the magnetic disk a plurality of servo signals to detect a position of the head, comprising:
  a step 1 of recording a clock track by using the writing element of the head;
  a step 2 of measuring the total number of clock bits in one revolution of the clock track by playing back the clock track using the reading element of the head;

a step 3 of calculating the number of clock bits between servo signals to be recorded by dividing the total number of clock bits measured by the step 2 by the number of servo signals to be recorded; and a step 4 of recording, by using the writing element of the head, the servo signals at a time interval corresponding to the number of clock bits calculated by the step 3.

7. A servo signal recording method according to claim 6, wherein a plurality of markers are recorded in the clock track at a predetermined interval so that their circumferential positions in the clock track are identifiable.

8. A servo signal recording method according to claim 7, wherein a result of measuring a time interval it takes for each of the makers to pass the head is added up to determine the number of clock bits in one revolution of the disk.

9. A servo signal recording method according to claim 6, wherein, in the step 4, a circumferential write start position of each servo signal is determined by counting the clock bits in such a manner that the number of clock bits calculated to a fractional part by dividing the total number of clock bits by the number of servo signals is the interval between the servo signals.

10. A servo signal recording method according to claim 6, wherein, in the step 4, as a clock signal for outputting a servo signal write current, a clock signal that is intermittently generated for each servo signal to be recorded according to a phase of a readback waveform from the magnetic disk is used.

11. A servo signal recording method according to claim 7, wherein the clock track is provided at an innermost circumferential position of the magnetic disk.

12. In a magnetic disk apparatus including a magnetic disk for storing information, a head having a writing element for writing information on the magnetic disk and a reading element for reading information from the magnetic disk, and an actuator for moving the head to a desired radial position, wherein the magnetic disk has a plurality of servo sectors in which a servo signal is to be recorded and a clock track in which a reference clock is to be recorded, wherein the clock track has a plurality of markers that are arranged at a predetermined interval and whose circumferential positions are identifiable; a servo signal recording method for recording in the magnetic disk a plurality of servo signals to detect a position of the head, comprising:

a step 1 of recording a clock track by using the writing element of the head;

a step 2 of measuring the total number of clock bits in one revolution of the clock track by playing back the clock track using the reading element of the head;

a step 3 of calculating the number of clock bits between the servo sectors to be recorded by dividing the total number of clock bits measured by the step 2 by the number of servo sectors to be recorded; and a step 4 of arranging the servo sectors at a time interval corresponding to the number of clock bits calculated by the step 3 and recording servo signals in the servo sectors by using the writing element of the head;

wherein, in the step 4, a start position of each servo sector is determined based on detected positions of the markers played back by using the reading element of the head.

13. A servo signal recording method according to claim 12, wherein the marker-servo sector delay progressively increases in a scan direction of the head from a shortest marker-servo sector delay.

\* \* \* \* \*